U S010880201B2

(12) United States Patent  
Varki

(10) Patent No.: US 10,880,201 B2  
(45) Date of Patent: Dec. 29, 2020

(54) GEOGRAPHIC POSITIONING OF DATA STORAGE FOR EFFICIENT DATA FLOW ACROSS COMMUNICATION NETWORKS

(71) Applicant: University of New Hampshire, Durham, NH (US)

(72) Inventor: Elizabeth Varki, Lee, NH (US)

(73) Assignee: University of New Hampshire, Durham, NH (US)

( * ) Notice: Subject to any disclaimer, the term of this patent is extended or adjusted under 35 U.S.C. 154(b) by 0 days.

(21) Appl. No.: 15/786,314

(22) Filed: Oct. 17, 2017

(65) Prior Publication Data

US 2018/0109438 A1 Apr. 19, 2018

Related U.S. Application Data

(60) Provisional application No. 62/409,185, filed on Oct. 17, 2016.

(51) Int. Cl.
*H04L 12/733* (2013.01)
*H04W 40/20* (2009.01)

(52) U.S. Cl.
CPC .......... *H04L 45/122* (2013.01); *H04L 45/126* (2013.01); *H04L 45/20* (2013.01); *H04W 40/20* (2013.01)

(58) Field of Classification Search
CPC ..... H04L 45/122; H04L 45/126; H04L 45/20; H04W 40/20
See application file for complete search history.

(56) References Cited

U.S. PATENT DOCUMENTS

| 6,959,335 | B1* | 10/2005 | Hayball | .................. | H04L 47/10 |
| | | | | | 709/227 |
| 7,355,986 | B2* | 4/2008 | Vanderveen | .......... | H04W 40/18 |
| | | | | | 370/255 |
| 7,739,390 | B2* | 6/2010 | Brahmbhatt | .......... | H04L 67/104 |
| | | | | | 709/227 |
| 8,144,686 | B2* | 3/2012 | Sahni | .................. | H04L 41/0896 |
| | | | | | 370/351 |
| 8,432,808 | B1* | 4/2013 | Dankberg | ............... | H04W 4/06 |
| | | | | | 370/235 |

(Continued)

OTHER PUBLICATIONS

Anukool Lakhina et al., "Structural Analysis of Network Traffic Flows", Nov. 10, 2003, 26 pages.
"Building the Internet Together, 2015 Annual Report", Amsix, 2015, 63 pages.
L.R. Ford, Jr., et al., "Constructing Maximal Dynamic Flows From Static Flows", The Rand Corporation; Jan. 6, 1958, 16 pages.
"Annual Report 2015", De-Cix, 2015, 33 pages.

(Continued)

*Primary Examiner* — Huy D Vu
*Assistant Examiner* — Bailor C. Hsu
(74) *Attorney, Agent, or Firm* — Finch & Maloney PLLC

(57) ABSTRACT

Techniques are provided for generating data on the optimum number of storage-hops, the location of the storage-hops, and the bandwidth distributions of the storage-hops to construct a complete flow network for transmitting data from a sender to a receiver via a communication network. The flow network can potentially include hundreds of storage-hops, depending on the time and duration of the data flow. An algorithm is further provided for constructing an unbounded flow network from a bounded set of input parameters. Moreover, the complexity of the algorithm does not depend on the number of storage-hops, so the model is suitable for both crowd supported and data center supported transfers.

10 Claims, 9 Drawing Sheets

(56) References Cited

U.S. PATENT DOCUMENTS

| | | | |
|---|---|---|---|
| 8,503,336 B2* | 8/2013 | Rappaport | H04L 41/145 |
| | | | 370/252 |
| 8,560,685 B1* | 10/2013 | Deshpande | H04L 43/04 |
| | | | 707/776 |
| 8,705,342 B2* | 4/2014 | Yu | H04L 12/4641 |
| | | | 370/216 |
| 9,130,958 B2* | 9/2015 | Cho | H04L 65/4084 |
| 9,369,976 B2* | 6/2016 | Shauh | H04W 56/001 |
| 9,794,130 B2* | 10/2017 | Jenkins | H04L 43/04 |
| 10,136,311 B2* | 11/2018 | Bhargava | H04W 12/04 |
| 10,285,208 B2* | 5/2019 | Schwartz | H04W 36/22 |
| 2007/0294422 A1* | 12/2007 | Zuckerman | H04L 67/104 |
| | | | 709/230 |
| 2013/0346578 A1* | 12/2013 | Varki | H04L 47/28 |
| | | | 709/223 |
| 2017/0093648 A1* | 3/2017 | ElArabawy | H04L 41/5067 |
| 2017/0339245 A1* | 11/2017 | Pacella | H04L 67/32 |

OTHER PUBLICATIONS

Nikolaos Laoutaris et al., "Delay Tolerant Bulk Data Transfers on the Internet", Sigmetrics '09 Proceedings of the Eleventh International Joint Conference on Measurement and Modeling of Computer Systems, 2009, 12 pages.

Cong Shi et al., "iDTT: Delay Tolerant Data Transfer for P2P File Sharing Systems", IEEE Globecom 2011 Proceedings, 2011, 5 pages.

Nikolaos Laoutaris et al., "Inter-Datacenter Bulk Transfers with NetStitcher", SIGCOMM' 11, Aug. 15-19, 2011, 15 pages.

Cormen, Thomas H. et al., "Introduction to Algorithms", The MIT Press, 2nd Edition, 2001, Chapter 26, 58 pages.

"Annual Report 2015 London Internet Exchange", Linx, 2015, 20 pages.

Yuan Feng et al., "Postcard: Minimizing Costs on Inter-Datacenter Traffic with Store-and-Forward", IEEE, 2012, 8 pages.

* cited by examiner

GEOGRAPHIC POSITIONING OF DATA STORAGE FOR EFFICIENT DATA FLOW ACROSS COMMUNICATION NETWORKS

CROSS REFERENCE TO RELATED APPLICATIONS

This patent application claims the benefit of U.S. Provisional Application No. 62/409,185, filed Oct. 17, 2016, and entitled "GEOGRAPHIC POSITIONING OF STORAGE FOR OPTIMAL NICE FLOW," which is incorporated herein by reference in its entirety.

FIELD OF THE DISCLOSURE

This disclosure relates generally to data processing over a communication network, and more particularly, to techniques for efficiently transferring large amounts of data via a communication network.

BACKGROUND

Internet data traffic at end networks depends on the sleep-wake cycle of its users. Typically, traffic is high during the day and drops off during early morning hours. An end user wanting to transmit large amounts of data (for example, tens of thousands of gigabytes) to another end user over the Internet may wish to schedule the transmission for the early morning hours when congestion is low and bandwidth availability is high. However, when the sender and receiver are in different time zones, their hours of high bandwidth availability may not be synchronized. For instance, even if the sender transmits during early morning hours local time, the receiver (in a different time zone) and parts of long haul networks may be highly congested, leading to low transmission rates.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Overview

As discussed above, when the sender and receiver are in different time zones, the sender, the receiver, or portions of the communication network may be congested. A solution to this problem is to transfer the data set from sender to receiver indirectly via one or more storage-hops, which can include data centers or end user client programs. The storage-hops can be positioned such that every transmission to and from a storage-hop occurs during low congestion early morning hours.

The end-to-end indirect file transfer is a maximum flow problem. To formulate and solve the problem, a flow network that models the flow of data between the sender and receiver via one or more storage-hops is constructed. However, this problem statement only provides information on the sender/receiver networks; there is no data on storage-hops.

To this end, and in accordance with an embodiment of the present disclosure, techniques are provided for generating data on the optimum number of storage-hops, the location of the storage-hops, and the bandwidth distributions of the storage-hops to construct a complete flow network. The flow network can potentially include hundreds of storage-hops, depending on the time and duration of the data flow. An algorithm is further provided for constructing an unbounded flow network from a bounded set of input parameters. Moreover, the complexity of the algorithm does not depend on the number of storage-hops, so the model is suitable for both crowd supported and data center supported transfers.

Numerous configurations and variations will be apparent in light of this disclosure.

System Architecture

Figure 1:
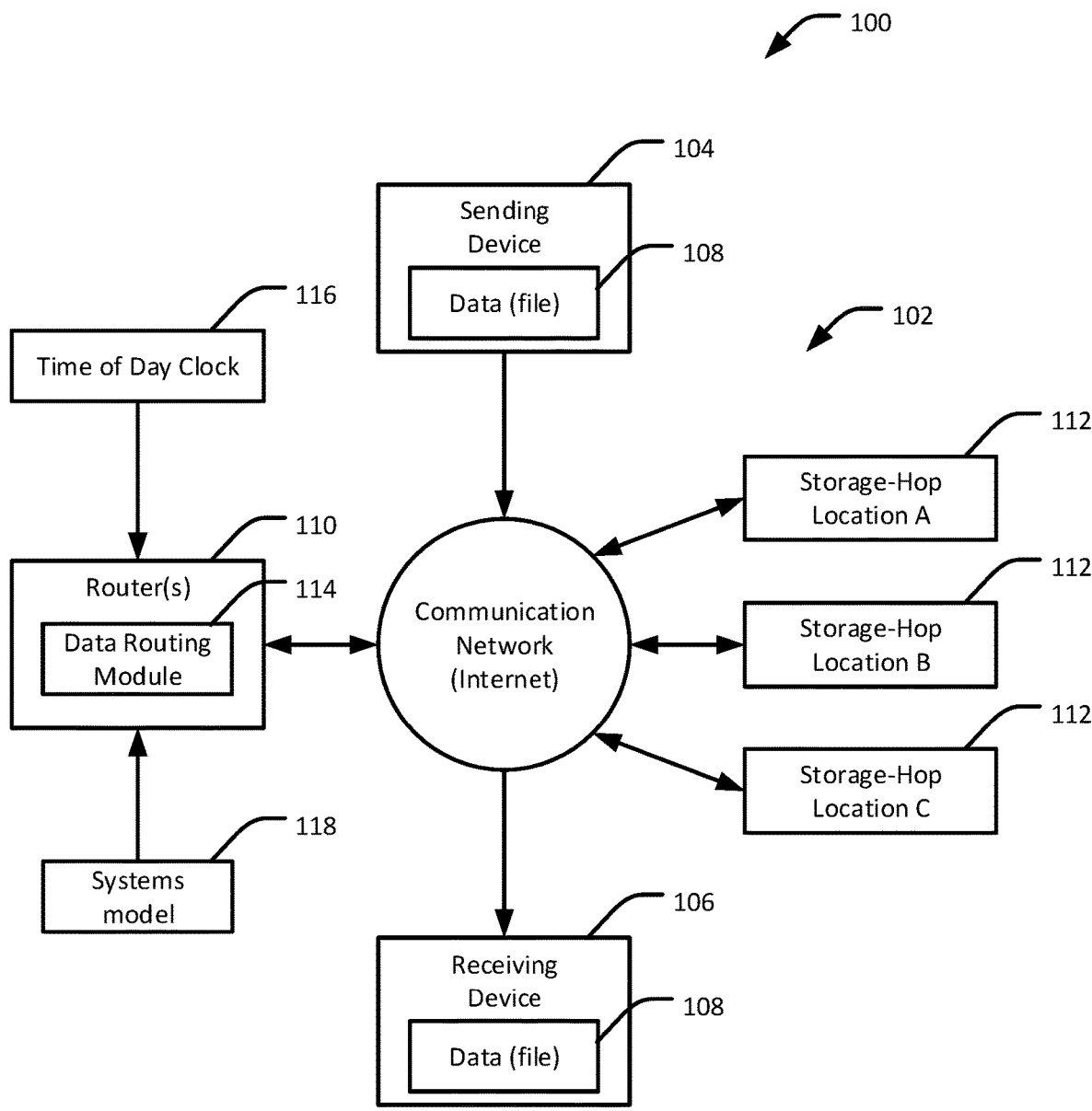
FIG. 1 shows an example system for transferring data via a communication network, in accordance with an embodiment of the present disclosure.

FIG. 1 shows an example system 100 for transferring data via a communication network 102, in accordance with an embodiment of the present disclosure. The system 100 includes a sending device 104 (sender) and a receiving device 106 (receiver) interconnected via the communication network 102. The sender and receiver are computer devices or other devices and items (such as Internet-connected or Internet of things (IoT) devices) configured to exchange information (data 108) each other digitally and electronically. The communication network 102 can include any conventional communication network, including the Internet, which has at least one router 110 (and likely many such routers) configured to route the data 108 through the resources of the network 102. The router(s) 110 include a data routing module 114 configured to manage the flow of data traffic through the network 102 according to a systems model 118. In some embodiments, the system 100 includes a time of day clock 116 configured to provide the time of day to the router 110 or other portions of the network 102. The resources of the network 102 may include one or more storage-hops 112, which are devices configured to at least temporarily store all or portions of the data 108 while the data is in transit through the network 102. Each of the storage-hops 112 is physically located in a particular geographical location (e.g., San Francisco, London, Sydney, Tokyo, etc.), and multiple storage-hops 112 may be located in different geographical locations. In general, the sender 104 can transmit data 108, such as a digitally encoded file, to the receiver 106 via the communication network 102. In some cases, the data 108 can be routed directly from the sender 104 to the receiver 106. In some other cases, the data 108 can be routed indirectly from the sender 104 to the receiver 106 via one or more of the storage-hops 112. The data routing module 114 is configured to route the data 108 from the sender 104 to the receiver 106 according to the systems model 118, such as described in further detail below.

Consider the following scenario: an end user wants to transmit a terabyte sized data set to another user by a given deadline. The sender 104 and receiver 106 are ordinary users at end networks, such as campus networks, and share end network resources with other users; each user has access to 100 Mb/s for most of the day. The sender 104 and receiver 106 have permission to access large bandwidth, say 10 gigabytes/second (Gb/s), from 1:00 AM to 6:00 AM local time. The sender 104 is in UK and the receiver is in Japan 106 such that the sender is eight hours behind the receiver.

This is a realistic scenario since traffic at end networks and Internet Exchanges (IXs) increases during the day, peaks around 8:00 PM, and then drops off around 1:00 AM; network traffic has a wave distribution that mimics users' sleep-wake cycle (e.g., nighttime hours versus daytime hours). End networks purchase fixed Internet bandwidth based on peak usage, so there is more unused bandwidth when traffic tapers off. A file's end-to-end transmission time depends on the file's size and the bandwidth capacity. With 100 megabytes/second (Mb/s), a terabyte is transmitted in 22.23 hours; with 10 Gb/s, a terabyte is transmitted in 0.23 hours. It is faster, cheaper, and nicer (to other end network users) to schedule greedy, bandwidth intensive transmissions for early morning hours when relatively few users are on the Internet.

The transmission rate of an end-to-end transmission depends not only on the bandwidth at the two end networks but also on the bandwidth at the connecting long haul networks, including the communication network 102 (e.g., the Internet). When the sender 104 and receiver 106 are in different time zones, their low traffic times are out-of-sync. When the sender's 104 network has light traffic, the receiver's 106 network and parts of the long haul networks 102 are congested. For example, reconsider the UK-Japan scenario where both sender 104/receiver 106 have access to 10 Gb/s from 1:00 AM to 6:00 AM and 100 Mb/s during other times. A direct transmission from the sender 102 to the receiver 104 has rate of 100 Mb/s at all times. Even if the users at UK and Japan have access to 10 Gb/s for 24 hours each day, the transmission rate is lower than 10 Gb/s due to congestion in long-haul networks and IXs.

An end user transfers files to another end user in one of two ways: 1) directly using protocols such as email, ftp, HTTP, or 2) indirectly via the cloud, where the sender uploads to the cloud and the receiver later downloads from the cloud. The direct file transfer time is the end-to-end transmission time from sender to receiver. In the UK-Japan example, the direct file transfer of a terabyte, at 100 Mb/s, takes 22.23 hours. The indirect file transfer time is the sum of the end-to-end transmission times from sender to cloud and from cloud to receiver plus the cloud storage time. In the UK-Japan example, suppose the cloud storage network has 10 Gb/s at all times; the UK sender uploads a terabyte to the cloud at 5:00 AM; 12 hours later, it is 1:00 AM in Japan and the receiver downloads the terabyte data set; the file transfer time is 12.23 hours (11.77 hours storage plus 0.46 hour transmission). Thus, the indirect transfer is faster than the direct transfer even though the file is in transit storage for almost 12 hours.

A transfer, direct or indirect, is greedy because its end-to-end transmissions access as much unused bandwidth as they can get. When the sender 104 and receiver 106 are in different time zones and have bandwidth distributions that vary with time, the indirect transfer is faster than the direct transfer. The indirect transfer requires the inclusion of one or more transit storage-hops 112. These storage-hops 112 may be data centers or end user clients (similar to a BitTorrent client) that store data temporarily en route to the receiver 106. The goal is to select "nice" storage-hops such that every end-to-end transmission of an indirect transfer lies in the low traffic time zones. If the transmission does not traverse congested long-haul networks and IXs, then there is a high probability that the long-haul networks and IXs are not a bottleneck. When end-to-end transmissions are contained within low traffic time zones, the greedy transfer is nice to other users.

In the UK-Japan example, a nice indirect transfer is as follows: select three storage-hops where hop1 is 4 hours behind UK, hop2 is 4 hours behind hop1, hop3 is 4 hours behind hop2 (and 4 hours ahead of Japan). At 5:00 AM, UK transmits to hop1 (where it is 1:00 AM); at 5:00 AM, each storage-hop transmits to the hop that is 4 hours behind it; when it is 1:00 AM in Japan, hop3 (at 5:00 AM) transmits the file to Japan. This indirect transfer consists of four end-to-end transmissions that are all contained within low traffic time zones. The file transfer time is 12.23 hours (11.31 hours storage plus 0.92 hour transmissions).

Embodiments of the present disclosure can be used to determine the systems model 118, which represents the optimum number and optimum geographic positioning of storage-hops 112 used by the router 110 to route the data 108 from the sender 104 to the receiver 106 given the following input parameters: the sender and receiver network's available bandwidth distributions, the number of bytes to be transferred, the earliest transfer start time, and the latest transfer completion time. In addition, embodiments of the present disclosure provide techniques for generating the indirect transfer paths from sender to receiver via one or more storage-hops, and for transferring data along those transfer paths. We refer to the problem as GPSonflow: Geographic Positioning of Storage for optimal nice flow.

GPSonflow is a systems problem that involves end networks and the Internet. Finding the maximum number of bytes that can be transferred from one end network to another via one or more storage-hops is a maximum flow problem, which is a graph problem. The input to maximum flow algorithms are flow networks, which are directed graphs. Thus, GPSonflow is a system problem that is solved by mapping to a graph problem. The GPSonflow network may have hundreds and thousands of nodes depending on the number of storage-hops, the duration of transfer, and the variance in the bandwidth distribution. Therefore, constructing a single GPSonflow network is a significant task. Moreover, for each transfer start time, a new GPSonflow network must be constructed. To find the optimal start time, several GPSonflow networks must be constructed. An algorithm is provided for constructing the GPSonflow network from a constant number of input parameters.

Disclosed embodiments provide: 1) the formulation of the GPSonflow problem, 2) the development of a flow model that has smaller size (i.e., number of edges) than prior models of the application, and 3) the development of an algorithm that automatically constructs the GPSonflow network. A feature of the algorithm is that it constructs the unbounded GPSonflow network from a constant number of input parameters.

The sleep-wake pattern of Internet traffic with greater unused bandwidth during sleep hours is a defining feature of GPSonflow. The sleep-wake traffic pattern can be used to identify that the model is a dynamic flow network where arc capacities vary with time. The nodes of the flow graph represent the sender, receiver, and storage hops, and the arcs represent bandwidth capacities between nodes. To construct the flow model, the bandwidth distribution of all participating storage-hops is used. The storage-hops (and their bandwidth distributions) are provided in the problem statement. Consequently, the problem statement provides sufficient information to construct the flow network.

Unlike conventional techniques, which require that the bandwidth distribution of every storage-hop 112 be provided, techniques in accordance with various embodiments use the bandwidth distributions of the sender 104 and receiver 106. If storage-hop data are not provided in the input, then the bandwidth distribution and the location for storage-hops 112 can be generated using embodiments of the present disclosure.

The number of nodes (e.g., storage-hops 112) and arcs (connections between storage-hops 112) in the flow model is dependent on the number of participating networks (sender, receiver, and storage-hops) and the flow duration. A GPSonflow network may have several hundred nodes depending on the flow duration. An algorithm is provided for automatically constructing the flow network from a minimal set of system parameters that includes the sleep-wake Internet traffic pattern.

The quickest way to transfer a large file (data set) from sender to receiver is by dividing the file into segments, where each segment is transferred along a unique path. Storage-hops can include data centers with the capacity to store and transmit large segments. Client machines have limited bandwidth and storage, so segments are smaller and each client machine is constrained to participate in the transfer of at most one segment. Thus, when storage-hops are client machines, a greater number of hops—a crowd—participate. The size of the flow model is dependent on the number of storage-hops, so the flow network for data center supported GPSonflow may be smaller than crowd supported GPSonflow. The complexity of the model construction algorithm is $O(T)$ where T is the flow duration (i.e., the complexity of the algorithm does not depend on the number of storage-hops). Consequently, a flow model constructed in accordance with various embodiments can be used to generate transfer paths from sender to receiver where the intermediate storage-hops can be either crowds of client machines or data centers.

Direct Transfer

Direct transfers are end-to-end transmissions from sender to receiver with no storage-hops. The solution outputs the maximum file size that can be transferred. For direct transfers, there are two possibilities: 1) the available bandwidth distributions at the sender/receiver networks are constant, and 2) the available bandwidth distributions at the sender/receiver networks vary with time.

For each case, we first construct a systems model 118, which we then map to a graph model—a flow network (also referred to herein as a flow model). The maximum flow computed from the flow network is the largest file size that can be transferred from a sender's network to a receiver's network.

Direct Transfer—Constant Bandwidth

Systems model: The sender 104 and receiver 106 are end network ASs (Autonomous Systems). Let the sender 104 be represented by s and the receiver 106 by r. The end-to-end transmission rate from s to r is determined by the bandwidth capacities of links between s and r. The sender 104 and receiver 106 have constant bandwidth for large transfers. The sender 104 has uplink to the Internet and the receiver 106 has downlink from the Internet. The sender's uplink capacity, ul, is the minimum of the sender's local area network (LAN) uplink and its backbone (BB) Internet uplink. Let ul(s) represent the total uplink bandwidth available for GPSonflow during transfer duration.

$$ul(s)=\text{minimum}\{LANul(s),BBul(s)\}$$

Similarly, the receiver's downlink capacity, dl, is determined by the receiver's Internet backbone downlink which connects to its LAN downlink. Let dl(r) represent the total downlink bandwidth available for GPSonflow during transfer duration.

$$dl(r)=\text{minimum}\{LANdl(r),BBdl(r)\}$$

The Internet uplink/downlink bandwidth capacities of end networks are usually public. The bandwidth capacity between s and r is determined not only by the uplink from s and downlink to r but also by the links between s and r. The sender and receiver ASs are end networks (LANs) that are connected via backbone ASs (Wide Area Networks or WANs). The Internet has a mesh structure, so there are several paths between s and r. A parameter for end-to-end transmission is the total bandwidth given to the transmission.

Let WAN(s, r) represent the total flow capacity from s to r along backbone networks during transfer duration. The maximum data flow between s and r can never exceed the minimum link capacities at s, r, and WAN(s, r). It is challenging for end users to find the value of WAN(s, r) since backbone ISPs typically conceal network details. End network customers pay for $95^{th}$ percentile backbone bandwidth usage, so an end network has access to the BB uplink and BB downlink bandwidth it has paid for. Moreover, the Internet has a large degree of redundancy for network availability. The architectural and business features of the Internet ensure that the backbone links are not usually a bottleneck, especially if the transmission passes over regions in the sleep cycle. Therefore, it is assumed that WAN(s, r)≥maximum {BBul(s), BBdl(r)}.

The uplink capacity, ul, of the sender's network and the downlink capacity, dl, of the receiver's network represent the systems model 118. Next, we map this to a graph model.

Graph model: When the bandwidth for GPSonflow is constant, the end-to-end transmission from the sender to receiver results in maximum data flow. The total bandwidth capacity for the end-to-end transmission is the minimum of the sender's uplink capacity to the Internet and the receiver's downlink capacity from the Internet. We construct a flow network with three nodes, namely, node s representing the sender end network, node r representing the receiver end network, and node x representing the Internet eXchange hub. The flow network has two arcs: the uplink from the sender is represented by an arc from s to x; the downlink to the receiver is represented by an arc from x to r. Thus, the flow network is a star graph with internal node x and two leaf nodes s and r. Let c( ) represent the capacity function along an arc:

$$c(s,x)=ul(s), \text{ and } c(x,r)=dl(r).$$

The largest file transferred from s to r is given by the maximum flow:

$$|f_{max}|=\text{minimum}\{c(s,x),c(x,r)\}$$

Example 1—Computing Maximum Flow when Available Bandwidth is Constant

What is the maximum number of bytes that can be transmitted from UK to Japan during 12 hours given that the sender has bandwidth capacity of 10 Gb/s and the receiver has bandwidth capacity of 20 Gb/s.

Figure 2:
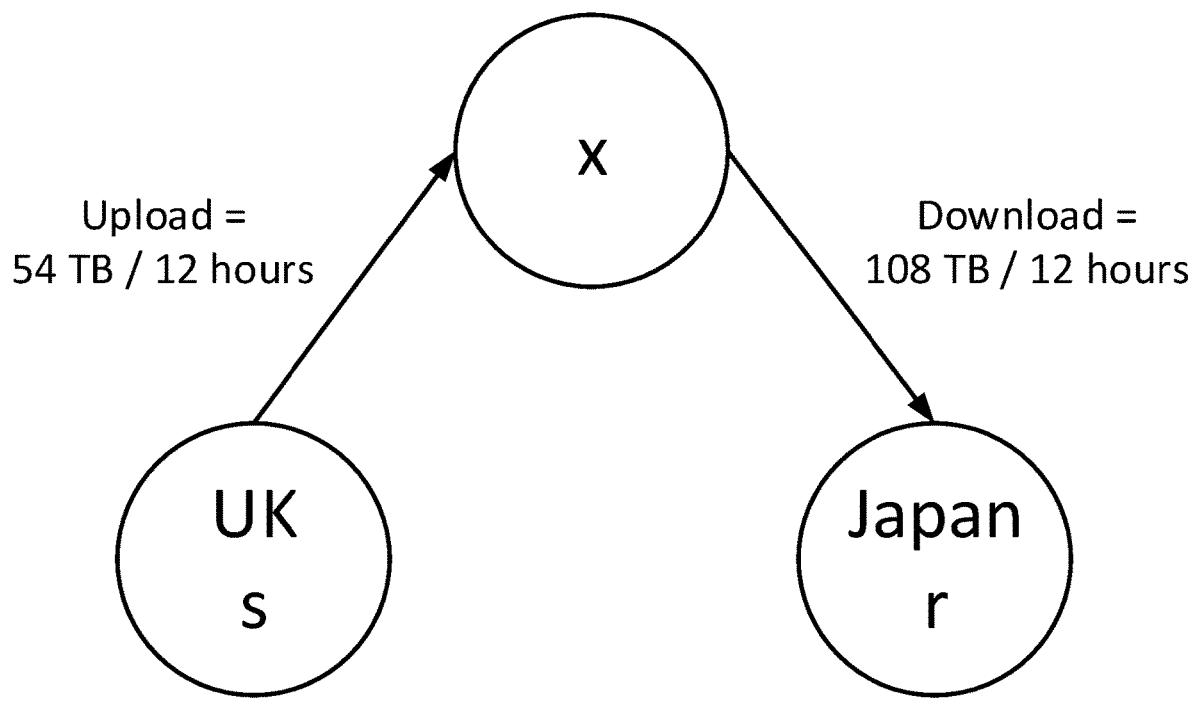
FIG. 2 depicts an example of a flow network, in accordance with an embodiment of the present disclosure.

For the example, ul(s)=54 TB/12 hours, dl(r)=108 TB/12 hours, so maximum flow=minimum{54, 108}=54 TB/12 hours. FIG. 2 depicts a flow network for this example.

The unit for bandwidth capacity is bits/second; the unit for file size is bytes. The GPSonflow problem deals with transfer over a period of several hours during which terabytes of data can be transferred. Mapping from bits to bytes to terabytes is routine, yet distracting, as seen in the above example. Therefore, we drop units altogether when units are understood from context or when units are irrelevant to the context. With reference to Example 1, units are clear from context, so we simply state that ul(s)=54, dl(r)=108, and the maximum file size is 54.

Direct Transfer—Variable Bandwidth

The available capacity is the unused capacity on a link, which varies depending on Internet traffic. The intensity of Internet traffic varies with time of day. Network administrators may allot users different bandwidth capacities during the day depending on Internet traffic. The parameter specifications, ul(s), dl(r), do not capture the dependence of bandwidth with time of day.

Significance of Time

Time is the significant parameter that determines the performance of large file transfers since bandwidth varies with time. There are different specifications of time—local time $\lambda$, coordinated universal time (UTC) $\tau$, and flow time t (i.e., time since the start of file transfer from sender). For a network v, let ul(v, $\tau$) and dl(v, $\tau$) represent bandwidth by UTC; let ubw(v, $\lambda$) and dbw(v, $\lambda$) represent bandwidth by local time; let c( ) represent bandwidth capacity by flow time t. Each type of bandwidth specification is used during different stages of model development.

Local time $\lambda$: The available bandwidth at a network depends on the sleep-wake cycle, which depends on local time. The dependence of bandwidth on local time is universal, since Internet traffic at end networks and IXs around the globe display this usage pattern. Thus, available bandwidth of node v by local time, ubw(v, $\lambda$) and dbw(v, $\lambda$), is meaningful for problem input specifications.

UTC time $\tau$: The sender and receiver could be in different time zones, so their local times are asynchronous. The end-to-end flow from sender to receiver depends on the bandwidth capacities at the sender and receiver at the same instant. The UTC time is invariant of global positioning, and end-to-end flow between networks u and v at any UTC instant $\tau$ is given by the minimum of ul(u, $\tau$) and dl(v, $\tau$).

Flow time t: The end-to-end flow capacity is relevant only after the sender initiates file transfer at flow time t=0. The model specifies bandwidth at end networks from the flow start time until the flow end time (t=T-1). Thus, available bandwidth c( ) by flow time t is meaningful for model construction.

Why evaluate three formulations of time? The state of the GPSonflow model at any instant is given by the bandwidth capacity, at that instant, in all the participating networks (s and r for direct flow). The number of states in the model depends on flow duration, an unbounded variable. The time of day, formulated by local time and UTC time, are bounded by the length of a day; the flow time is bounded by flow duration, which is unbounded. If we can quantify the relationship between the different types of time then it might be possible to bound the number of the states in the model. We evaluate the alternative specifications of time and bandwidth distributions, and develop the mapping between the three types of bandwidth distributions.

Model Time Unit $\delta$

Discrete time and continuous time are two alternative frameworks within which to model the dependence of bandwidth on time. The selected framework affects model construction (and consequently, solution algorithms) but does not affect model outputs. We parameterize time as a discrete variable. When time is discrete, the 24 hour day is divided into discrete time instants (or steps). Without loss of generality, $\delta$ is specified in minutes. The number of time instants depends on the time unit $\delta$: if $\delta$ is 60 minutes, then the day is divided into 24 time instants; if $\delta$ is 1 minute, then the day is divided into 1440 time instants; if $\delta$ is 180 minutes, then the day is divided into 8 time instants. Each time instant represents a time period of one time unit.

The selection of a time unit must allow the division of the hour/day into equal time periods; for example, a time unit of 7 minutes is unsuitable. The modeler determines the time unit, which could be a few milliseconds or several hours. If available bandwidth changes every few milliseconds, then $\delta$ of 1 second balances accuracy and speed; if the bandwidth changes gradually with time, then $\delta$ of 1 or more minutes is appropriate. A time unit of 3 to 5 minutes captures the variance in available bandwidth. The bandwidth capacity at a time instant is the total bandwidth capacity for the time period represented by this time instant.

Once a value for $\delta$ is chosen, the next step is the specification of discrete time. A time instant is represented by clock time of hours:minutes:seconds. We represent time steps by 0, 1, 2, 3, . . . , where each time step maps to clock time. For example, suppose time instant 0 map to map to clock time 00:00:00. When $\delta$ is 60 minutes, time instant 1 maps to clock time 01:00:00; when $\delta$ is 1 minute, time instant 1 maps to clock time 00:01:00, and so on.

Time of Day

For time of day specification to be meaningful, it is necessary to understand whether time represents local time or UTC. The local time is always in context of geographic positioning whereas universal time is global. For example, at 00:00 UTC, it is 9:00 AM local time in Japan (ahead by 9 hours, same day), it is 7:00 PM local time in Boston (behind by 5 hours, previous day), and it is 12:00 AM midnight in UK (GMT zone 0 in winter). We choose universal time for the model since it is invariant of geographic positioning: the sender and receiver may be in different time zones, and UTC time anchors the bandwidth capacity at the end networks by time. We choose local time for problem input since available bandwidth distributions of end networks depend on the sleep-wake cycle (i.e., local time).

Time of day lasts for a total of 24 hours. Let $\Gamma$ represent the total number of time instants in a day; the value of $\Gamma$ depends on the time unit, $\delta$. The time instant 0 corresponds to the first time interval and $\Gamma-1$ corresponds to the last time interval.

UTC instant $\tau$: Let $\tau$ represent a UTC time instant, $\tau=0$, 1, 2, . . . , $\Gamma-1$. The time instant $\tau=0$ refers to the UTC time interval starting at 00:00 UTC, and $\tau=\Gamma-1$ refers to the last UTC time interval ending at 00:00 UTC. For example, if time unit, $\delta$, is 60 minutes, then $\Gamma=24$ and link capacities are defined for each hour in [00:00-23:00] UTC; $\tau=0$ represents [00:00-01:00) UTC, $\tau=1$ represents [01:00-02:00) UTC, . . . , and $\tau=23$ represents [23:00-00:00) UTC. If time unit, $\delta$, is 5 minutes, $\Gamma=288$, $\tau=0$ represents [00:00-00:05) UTC, $\tau=1$ represents [00:05-00:10) UTC, . . . , and $\tau=287$ represents [23:55-00:00) UTC. The link capacities, ul(s, $\tau$) and dl(r, $\tau$) are defined for each UTC instant, $\tau=0, 1, \ldots, \Gamma-1$. For example, suppose $\delta$ is 60 minutes: if uplink for s is 10 Gb/s from [03:00-04:00) UTC, then ul(s, 3)=4500 GB.

Local time instant $\lambda$: Let $\lambda$, represent a local time instant, $\lambda=0, 1, 2, \ldots, \Gamma-1$. The time instant $\lambda=0$ refers to the time interval starting at midnight, and $\tau=\Gamma-1$ refers to the time interval ending at midnight. For example, if $\delta$ is 60 minutes, then $\Gamma=24$ and link capacities are defined for each hour in [12:00 AM-11:00 PM]; $\lambda=0$ represents [12:00 AM-01:00 AM), $\lambda=1$ represents [01:00 AM-02:00 AM), ..., and $\lambda=23$ represents [11:00 PM-12:00 AM). The link capacities ubw(v, $\lambda$), dbw(v, $\lambda$) represent the uplink, downlink bandwidth capacity of an end network, v, at instant $\lambda$. When a network has the same uplink/downlink distribution, we simply use bw (not ubw, dbw). Note that the network v is dropped from the local bandwidth notation when v is clear from the context or when several networks have the same available bandwidth distribution by local time. For example, suppose $\delta$ is 60 minutes: if uplink from s and downlink to r is 10 Gb/s from [3:00 AM-4:00 AM), then ubw(3)=dbw(3)=bw(3) =4500 GB.

Example 2—Mapping Bandwidth by Local Time to Bandwidth by UTC

Suppose the sender's network in UK and the receiver's network in Japan permit large transfers from local time midnight to noon [12:00 AM-12:00 PM). Each time instant represents a 3 hour duration, so $\delta=180$ minutes and $\Gamma=8$. The available bandwidth distribution for the sender/receiver by local time, bw($\lambda$), is provided as input:
from [12:00 AM-3:00 AM), bw(0)=10,
from [3:00 AM-6:00 AM), bw(1)=20,
from [6:00 AM-9:00 AM), bw(2)=18,
from [9:00 AM-12:00 PM), bw(3)=8,
[12:00 PM-12:00 AM), bw(4)=bw(5)=bw(6)=bw(7)=0.

The sender and receiver have identical distribution by local time, but they are in different time zones, so their bandwidth distribution by UTC differs.

UK is in UTC+00:00 (zone 0), so local time equals UTC time. Therefore, the uplink, ul(s, $\tau$), from UK is given by:
ul(s, 0)=10; ul(s, 1)=20; ul(s, 2)=18; ul(s, 3)=8; ul(s, 4)=0; ul(s, 5)=0; ul(s, 6)=0; ul(s, 7)=0.

Japan is in UTC+09:00 (zone 9), so the local time is 9 hours ahead of UTC time (i.e., 3 time units ahead). Therefore the downlink, dl(r, $\tau$), to Japan is given by:
dl(r, 0)=8; dl(r, 1)=0; dl(r, 2)=0; dl(r, 3)=0; dl(r, 4)=0; dl(r, 5)=10; dl(r, 6)=20; dl(r, 7)=18.

UTC zone, z, and distance, d: As the above example shows, the UTC zone positioning of a network is necessary for mapping bandwidth specification by local time to bandwidth specification by UTC. It is assumed that there are 24 UTC zones with UTC time=local time in zone 0; UK is the country synonymous to zone 0. For a network v, let z(v) specify the UTC zone number of v, which is the number of hours separating v's zone from zone 0 (in the clockwise direction). For example, Pakistan is zone 5 (5 hours ahead of UK) and New York is zone 19 (5 hours behind). The number of time units separating the local time in v from the local time in zone 0 is the distance of v, d(v), from zone 0, and is given by $$d(v)=z(v)\times 60/\delta \qquad \text{(Equation 1)}$$

In the above example, d(s) is 0 and d(r) is 3; if v is in zone 21 (or 22 or 23), then d(v) is 7. If time unit $\delta$ is 1 minute, then d(r)=540 (where z(r)=9). With the inclusion of zones, geographic positioning is incorporated in the model.

Systems Model

The problem statement provides the available bandwidth distribution by local time for the sender and receiver's networks. The systems model 118 is the mapping of bandwidth capacity by local time instants to bandwidth capacity by UTC.

The model time unit is $\delta$ and it is assumed that both UTC time instants and local time instants represent a time period of $\delta$ duration. Note that it is possible that input bandwidth capacity is specified using a different time unit, $\Delta$; in this case, the input bandwidth capacity by local time must be remapped so that bw corresponds to time unit $\delta$. Example 6 illustrates this mapping from $\Delta$ to $\delta$.

Definition 1—systems model for direct transfer with variable bandwidth: The sender and receiver have available bandwidth capacity by local time specified by ubw(s, $\lambda$), dbw(r, $\lambda$), where $\lambda=0, 1, \ldots, \Gamma-1$ and $\lambda=0$ specifies the time period starting from midnight 12:00 AM. The mapping of bandwidth capacity by local time to bandwidth capacity by UTC is given by:

$$ul(s,\tau)=ubw(s,(d(s)+\tau)\bmod \Gamma)$$

$$dl(r,\tau)=dbw(r,(d(r)+\tau)\bmod \Gamma) \qquad \text{(Equation 2)}$$

where UTC instant $\tau=0, 1, \ldots, \Gamma-1$ and $\tau=0$ specifies the time period starting from 00:00 UTC. The function d( ) specifies the distance between a network's zone and zone 0, and is given by Equation 1.

Time of Flow t

Time of day relates to clock time, such as provided by the time of day clock 116. The model uses clock time to incorporate geographic positioning of each storage-hop 112 and dependence of available bandwidth to sleep-wake cycle. Therefore, time of day is relevant to the hardware platform—the systems model 118. Here, we explain time of flow, t, a parameter that is relevant to the application, namely transfer of file from sender to receiver. The time of flow clock starts when the transfer is initiated by the sender at t=0, and stops at t=T-1, where T is the flow duration. We specify time of flow as a discrete variable, which ranges from t=0, 1, 2, 3, ..., T-1. During each flow instant, t, data flows from one end network to another. The bandwidth capacity of end networks is required to compute flow at t; therefore, it is necessary to map t to time of day.

Mapping flow instant t to UTC instant $\tau$ with UTC start instant $\theta$: Let $\theta$ represent the UTC instant at which transfer is initiated from the sender. In the previous example, if transfer is initiated at 09:00 UTC ($\tau=3$) then $\theta=3$. Suppose transfer duration is 6 time instants; the UTC instants relating to transfer duration are: $\tau=\theta=3$, $\tau=\theta+1=4$, $\tau=\theta+2=5$, $\tau=\theta+3=6$, $\tau=\theta+4=7$, $\tau=\theta+5=0$. Thus, transfer runs from 09:00 UTC to 03:00 UTC the next day.

Each flow instant, t, corresponds to a time of day UTC instant $\tau$. The flow instant t=0 corresponds to UTC instant $\tau=\theta$ and flow instant t=T-1 corresponds to UTC instant $\tau=\theta+T-1$ in modulo $\Gamma$ arithmetic. The flow instants t=0, 1, 2, ..., T-1 correspond to UTC instants $\tau=\theta, \theta+1, \ldots, \theta+T-1$ modulo $\Gamma$.

Graph Model

The flow network for constant bandwidth is represented by a single star graph with two leaf nodes. The flow network for variable bandwidth is also represented by a single star graph with two leaf nodes with one major difference—the capacities along the arcs (s, x), (x, r) vary with time. The leaf nodes s and r have storage capacity; the hub node x has no storage capacity. This ensures that the flow network models end-to-end flow; a flow initiated from leaf node s at time t will arrive at a leaf node r at time t (or it could stay in node s until next flow instant t+1). When flow is initiated from leaf node s to leaf node r, the flow cannot exceed the minimum of c(s, x) and c(x, r).

Definition 2—dynamic flow model: For a flow duration t=0 until t=T−1 (UTC instants τ=θ until τ=θ+T−1 mod Γ), the flow network G=(V∪x, E, T) where V is the set of 2 nodes representing the sender s and the receiver r x represents a single hub node; and E is the set of arcs {(s, x), (x, r)}.

G* is a star network where the leaves are in node set V and the hub is node x. The nodes in V have infinite storage capacity, and the node x has zero storage capacity. The arcs in E have bandwidth capacity:

$$c(s,x,t)=ul(s,\tau)$$

$$c(x,r,t)=dl(r,\tau)$$

$\forall t=0,1,\ldots,T-1$ where $\tau=\theta+t$ in modulo $\Gamma$ arithmetic.

Figure 3A:
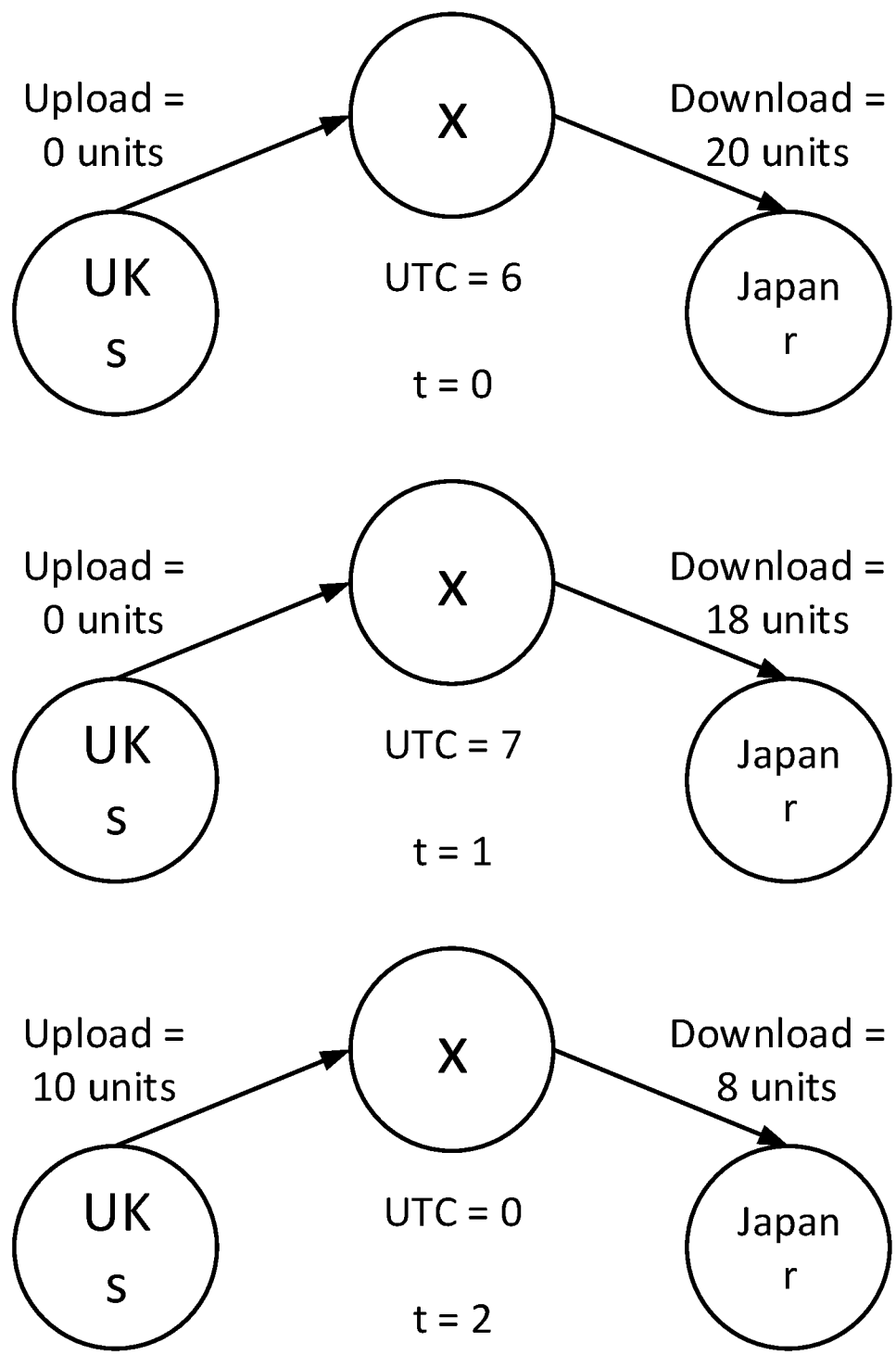
FIGS. 3A-B show a time expanded version of FIG. 2 when bandwidth varies with time, in accordance with an embodiment of the present disclosure.
Figure 3B:
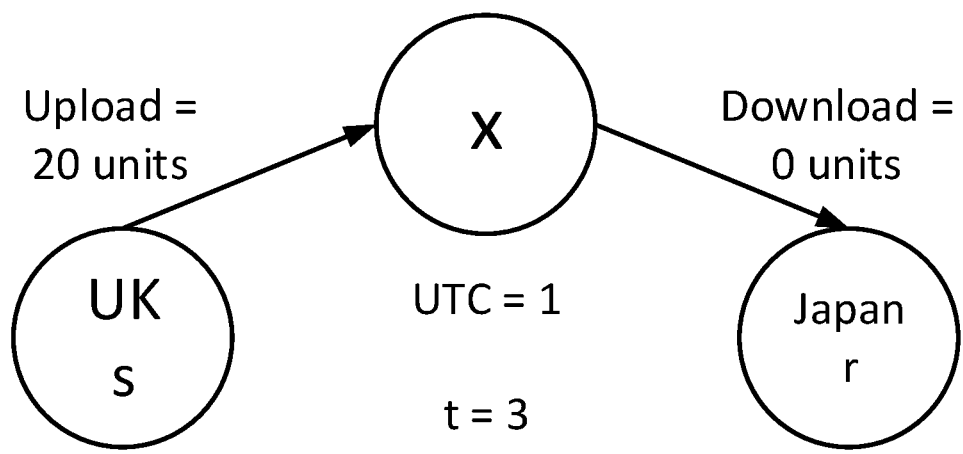

The majority of maximum flow algorithms ignore time by assuming instantaneous flow from sender to receiver; the corresponding flow network is static. The flow network for GPSonflow has arc capacities that vary with time; such a flow network is dynamic. For dynamic flows: convert a dynamic flow to a static flow using a time expanded flow network. The time expanded flow network is a static network in which there is a copy of the graph for each time instant 0≤t<T. FIGS. 3A-B show the time expanded version of FIG. 2 when bandwidth varies with time and duration is four time units. In FIGS. 3A-B, there are four subgraphs, each representing a different instant of time (t=0, 1, 2, 3). Not shown are holdover arcs across subgraphs from s to s and from r to r, which represent storage capacity at leaf nodes. The holdover arc ($s_t$, $s_t$+1) models s at t storing data for transmission at t+1. Storage capacity at end networks is not a bottleneck, so capacity of holdover arcs is set to infinity.

Definition 3—static flow model: The dynamic flow network G*=(V∪x, E, T) transforms to the static flow network G=($V_T$∪$X_T$, $E_T$∪$H_T$) where $V_T$ is the set of end nodes $s_t$, $r_t$, t=0, 1, ..., T−1;

$X_T$ is the set of hub nodes $x_t$, t=0, 1, ..., T−1;

$E_T$ is the set of arcs ($s_t$, $x_t$), ($x_t$, $r_t$), t=0, 1, ..., T−1;

$H_T$ is the set of holdover arcs ($s_t$, $s_t$+1), ($r_t$, $r_t$+1) t=0, 1, ..., T−2.

The arcs have capacity:

$$c(s_t,x_t)=c(s,x,t), c(x_t,r_t)=c(x,r,t),$$

$$c(s_t,s_t+1)=c(r_t,r_t+1)=\infty.$$

The dynamic flow from s to r is equivalent to a corresponding static flow from $s_0$ to $r_{T-1}$. Therefore, finding maximum flow in the dynamic network can be solved by finding maximum flow in the corresponding static time expanded network.

Definition 4—a flow in time expanded G is a function $f$: ($V_T$∪$X_T$)×($V_T$∪$X_T$)→$N_0$ satisfying the properties of capacity constraint, skew symmetry, and flow conservation. The value $|f_{max}|$ of the maximum flow $f$ in G is:

$$|f_{max}|=f(s_0,x_0)+f(s_0,s_1)=f(x_{T-1},r_{T-1})+f(r_{T-2},r_{T-1})=\Sigma t=0^{T-1} \text{minimum}\{c(s_t,x_t),c(x_t,r_t)\}$$

The advantage of mapping UTC instants to flow instants is that it allows the model to capture details of the hardware platform while ensuring that the model specification is hardware independent. The GPSonflow model is a graph model that implicitly specifies details of the hardware platform such as geographic positioning of end networks and Internet traffic.

Example 3—Computing Maximum Flow when Bandwidth Distribution Varies with Time

Consider the setup of Example 2. Suppose transfer is initiated from UK to Japan at UTC time instant θ=6 for 4 times instants; τ=6, 7, 0, 1. The values of ul(s, τ) and dl(r, τ) (as computed in Example 2) are: ul(s, 6)=0, ul(s, 7)=0, ul(s, 0)=10, ul(s, 1)=20; dl(r, 6)=20, dl(r, 7)=18, dl(r, 0)=8, dl(r, 1)=0. FIGS. 3A-B show the time expanded flow network for this example.

T=4 and t=0, 1, 2, 3:

max flow at t=0 is minimum{ul(s, 6), dl(r, 6)}=0, max flow at t=1 is minimum{ul(s, 7), dl(r, 7)}=0, max flow at t=2 is minimum{ul(s, 0), dl(r, 0)}=8, max flow at t=3 is minimum{ul(s, 1), dl(r, 1)}=0.

The total flow from UK to Japan is $\Sigma_{t=0}^{3}$ max flow=8 when GPSonflow is initiated at θ=6 for four time instants.

Example 4—Recomputing Maximum Flow at a Different Start Time

Figure 4A:
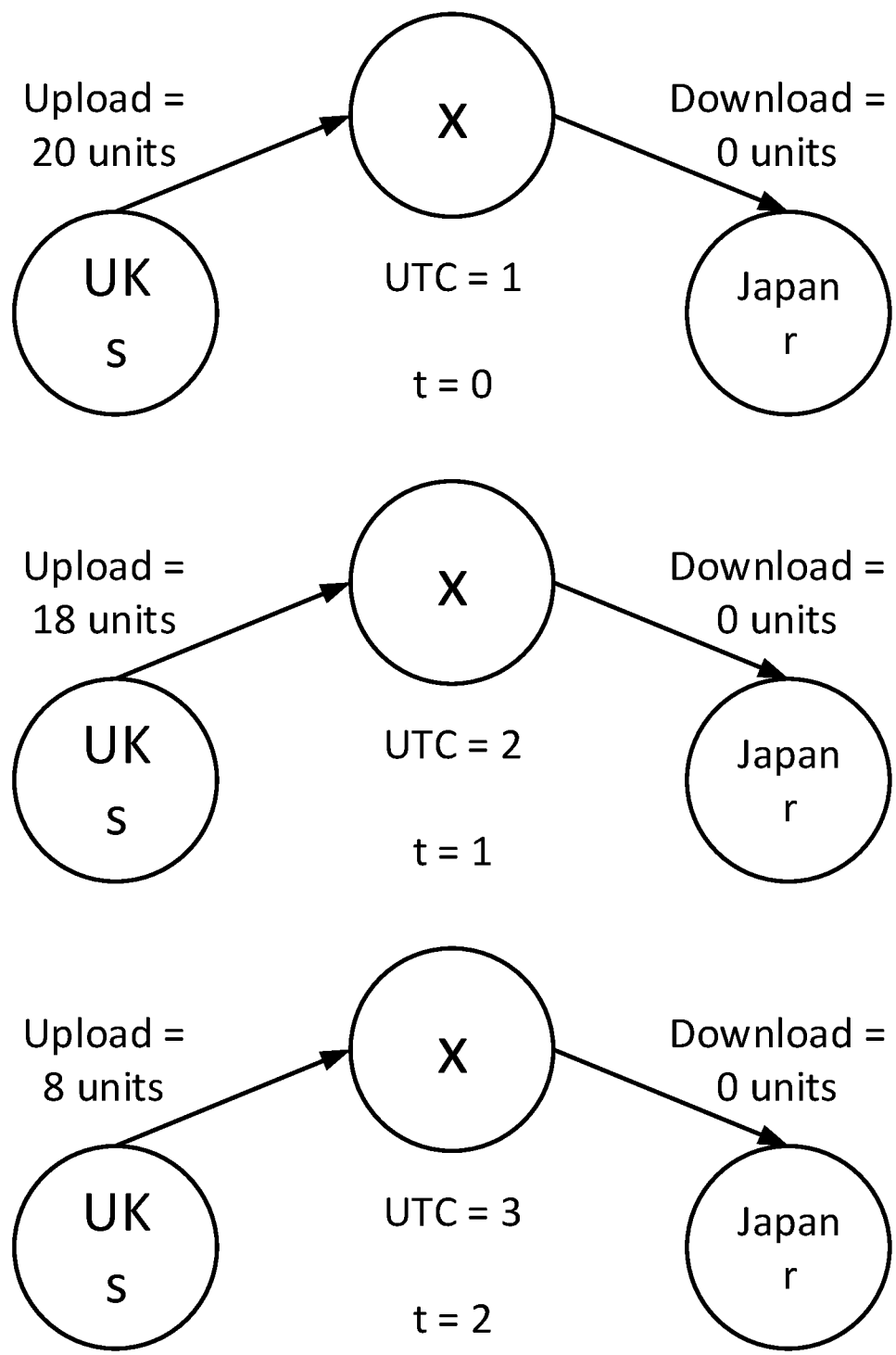
FIGS. 4A-B show another time expanded version of FIG. 2 when bandwidth varies with time, in accordance with an embodiment of the present disclosure.
Figure 4B:
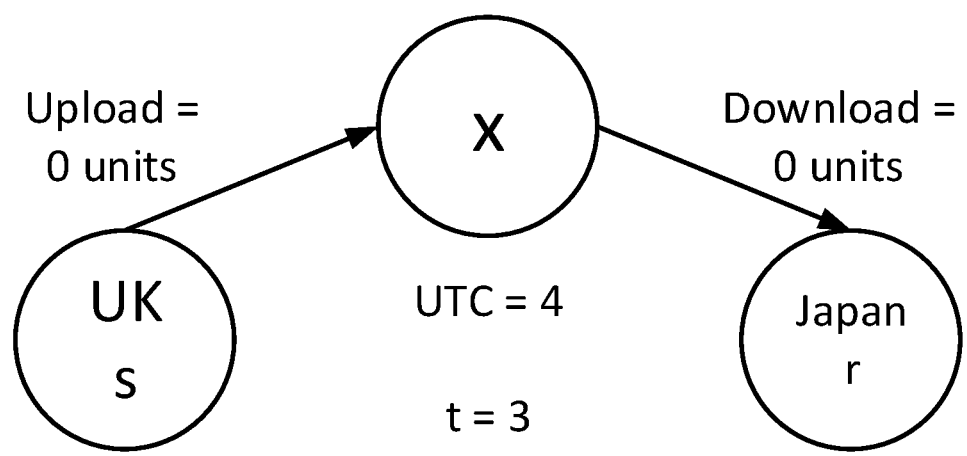

Reconsider Example 2, and suppose transfer is initiated from UK to Japan at θ=1 for 4 time instants. FIGS. 4A-B show the time expanded flow network for this example.

max flow at t=0 is minimum{ul(s, 1), dl(r, 1)}=0, max flow at t=1 is minimum{ul(s, 2), dl(r, 2)}=0, max flow at t=2 is minimum{ul(s, 3), dl(r, 3)}=0, max flow at t=3 is minimum{ul(s, 4), dl(r, 4)}=0.

The total flow from UK to Japan is $\tau_{t=0}^{3}$ max flow=0 when GPSonflow is initiated at θ=1 for four time instants.

A consequence of including variable bandwidth distribution in the GPSonflow model is that start instant, θ, becomes significant to the maximum file size computation. With each start time, a new flow network must be constructed since the capacities along the arcs changes. In Example 3, maximum file size transferred from UK to Japan is 8 when flow is initiated at θ=6; in Example 4, maximum file size transferred from UK to Japan is 0 when flow is initiated at θ=1.

Start and Stop Instants

In Example 3, flow is initiated at UTC instant 6, but transfer does not start until UTC instant 0. Since transmission does not occur during all flow instants, we define the following terms:

Definition 5—GPSonflow start instant (UTC instant θ, flow instant t=0) is the time instant that transfer starts from the sender; GPSonflow stop instant (flow instant t=T−1) is the last time instant at which data arrives at the receiver. GPSonflow duration is the difference between (stop instant+1) and the start instant.

In Example 4, when flow is initiated at UTC 1, there is no transmission during the next 4 instants. Therefore, as per the definition, there is no start instant, stop instant, nor transmission duration. When flow is initiated at UTC 6 (Example 3), start instant, 0=UTC 0, stop instant=UTC 0, and duration=1.

Note that start instant is flow instant t=0 and UTC instant θ; stop instant is flow instant t=T−1 and UTC instant τ=θ+T−1 in modulo Γ arithmetic. Transfer occurs between t=0 and t=T−1, so GPSonflow transfer duration is T. It is possible that there are time-of-flow instants with no transmission, but GPSonflow transfer duration is still T since duration is determined by start time and stop time.

The introduction of bandwidth distribution in the model results in new variations of the GPSonflow problem:

1. What is the maximum number of bytes that can be transferred from UK to Japan given that start time is UTC instant x and duration is y instants?

2. What is the start time that results in the maximum bytes being transferred from UK to Japan in y time instants?

3. Given a file size x, what time instant should GPSonflow be started so that the file can be transferred in minimum duration?

4. Given a file size and transfer completion time, what is the latest start time?

Indirect Transfer

When the sender 104 and receiver 106 are in different time zones, their high capacity time instants are asynchronous. With reference to Examples 2, 3, 4, maximum flow from UK to Japan is 8 even though each end network has total bandwidth capacity of 56 per day. A maximum of 56 flow units can be transmitted from UK to Japan if a suitable storage-hop 112 is found. Suppose a storage-hop 112 in Germany has uplink and downlink capacity of 20 flow units per time instant (time unit=3 hours) for the entire day. UK starts transmitting at UTC instant 0 when UK has uplink capacity 10 and Japan has downlink capacity 8. At UTC 0, UK transmits 8 flow units to Japan and the remaining 2 flow units to Germany. During the next three instants, UK transmits to Germany since Japan has 0 bandwidth capacity. When bandwidth becomes available in Japan, Germany transmits to Japan.

This example demonstrates that the entire data set (file 108) is not transferred along the same path. The file 108 is divided into segments of various sizes and each segment has a unique transfer path from sender 104 to receiver 106 with zero or more storage-hops 112. Given a sender 104 and a receiver 106, the problem is to find the best locations for each of the storage-hops 112 along the route, as defined by the systems model 118. A storage-hop 112 can be either a data center or an end user (application similar to a BitTorrent client). The best location for a storage-hop is one where every end-to-end transmission to-and-from the hop occurs during sleep times or other periods of relatively low network utilization. In the above example, Germany is not an optimal location since several of the end-to-end transmissions occur during Germany's wake cycle.

The location and available bandwidth distribution of storage-hops are inputs required for constructing the flow network. The number of storage hops, their optimal locations, and their bandwidth must be determined.

Storage-Hops

The location of storage-hops is relevant to the problem since every end-to-end transmission must conform to the sleep-wake traffic pattern. In other words, the end-to-end transmission must not exceed the constraints placed by the sleep-wake traffic pattern. Given a sender and receiver, we have to find the optimal locations for storage hops. To do so, we start with a simpler problem: what is the minimum number of storage-hop placements such that there is full coverage?

Impact of hardware platform on storage-hop placement: The defining feature of a storage-hop is its bandwidth availability at any time instant, and this is determined by its UTC time zone positioning. Therefore, full coverage is minimally possible by placing a storage-hop in every UTC time zone. It is impossible to place storage-hops 5 minutes apart by local time since there are no countries on earth that are 5 minutes apart by local time. There are locations that are half hour apart by local time—for example, India and Pakistan—but these are few and far between. The minimum local time distance between storage hops that allows for full coverage is an hour since there are countries in each of the 24 time zone where storage-hops can be placed. Therefore, full coverage for GPSonflow is provided by placing a storage-hop in UTC time zones 0 to 23, with each hop's local time an hour away from that of its left and right neighbor; a storage hop is an hour ahead of its left neighbor and an hour behind its right neighbor.

Note that placing storage-hops an hour apart gives full coverage, but one may formulate a problem with storage-hops placed in some of the time zones. For example, in the UK to Japan example, one may place storage-hops 3 hours apart, instead of 1 hour apart. It is not necessary to place storage-hops uniformly—one could randomly place storage-hops in zones 0, 1, 2, 3, 10, 15, 17, 19, 23. Placing storage-hops in every time zone gives the maximum options for nice flow from sender to receiver, but in real scenarios, one might only have storage-hops in some locations.

Available bandwidth distribution of storage-hops: The next problem to be addressed is: what is the minimum bandwidth needed at each storage-hop? At this stage in the problem formulation, we do not set any constraints on the bandwidth at each storage-hop, other than that the bandwidth distribution follows the sleep-wake cycle.

Example 5—Capturing Global Positioning of Storage-Hops in Model

Reconsider Example 2: Suppose storage hops 0, 1, 2, . . . , 7, are placed in countries that are 3 hours apart in zones 0, 3, 6, 9, 12, 15, 18, and 21. Suppose bandwidth distribution by local time of storage-hops is identical to that of the end networks in UK and Japan. The hops have identical distribution by local time, but they are in different time zones, so their bandwidth distribution by UTC differs. The uplink/downlink of hops 0 and 3 are identical to that of UK and Japan, respectively. Storage-hop 1 is in zone 3, so local time is 3 hours ahead of UTC time (i.e., 1 time unit ahead). Using Equation 2 to compute bandwidth capacities by UTC time:

$$ul(h1,0)=20; ul(h1,1)=18; ul(h1,2)=8; ul(h1,3)=0;$$

$$ul(h1,4)=0; ul(h1,5)=0; ul(h1,6)=0; ul(h1,7)=10.$$

Storage-hop 2 is in zone 6, so local time is 6 hours ahead of UTC time (i.e., 2 time units ahead).

$$ul(h2,0)=18; ul(h2,1)=8; ul(h2,2)=0; ul(h2,3)=0;$$

$$ul(h2,4)=0; ul(h2,5)=0; ul(h2,6)=10; ul(h2,7)=20.$$

The uplink/downlink capacities of other storage-hops are similarly computed.

Example 6—when Time Unit, Δ, for Local Time Instants is Different from Model Time Unit δ

Reconsider the above example: Suppose an additional storage-hop, hop 8, is placed in zone 1. Suppose bandwidth distribution (by local time) of this storage-hop is identical to that of other storage-hops. When it is midnight in zone 0 (=UTC 0), it is 01:00 AM in zone 1. At the next UTC instant (τ=1), when it is 3:00 AM local time at zone 0, it is 4:00 AM local time in zone 1. The input bandwidth specification by local time in Example 2 is along boundaries [12:00 AM-03:00 AM), [03:00 AM-06:00 AM), . . . , which correspond to UTC instants for storage-hops that are situated in zones that are 3 hours apart. For zone 1, correspondence is as follows: τ=0 maps to local time [01:00 AM-04:00 AM), τ=2 maps to

[04:00 AM-07:00 AM), . . . , and τ=7 maps to [10:00 PM-01:00 AM). In order to equate local time instants to UTC time instants, the bandwidth distribution by local time for storage-hop 8 in zone 1 has to be specified at different local time boundaries than that of the hops in zones 0, 3, 6, 9, 12, 15, 18, and 21.

When end networks are placed in zones that are less than 3 hours apart, the bandwidth capacity by local time must be specified over a duration that is at most an hour long. Let A represent the time unit for input bandwidth specifications. Reconsider the bandwidth distribution by local time of Example 2 (specified in 3 hour intervals). We now specify the bandwidth capacity over 1 hour intervals. Here A is 1 hour and local time instants range from λ=0, 1, 2, . . . , 23. The input bandwidth specifications by local time for A=60 minutes are:

[12:00 AM-1:00 AM) bw(0)=1,
[1:00 AM-2:00 AM) bw(1)=2,
[2:00 AM-3:00 AM) bw(2)=5,
[3:00 AM-4:00 AM) bw(3)=5,
[4:00 AM-5:00 AM) bw(4)=5,
[5:00 AM-6:00 AM) bw(5)=6,
[6:00 AM-7:00 AM) bw(6)=8,
[7:00 AM-8:00 AM) bw(7)=7,
[8:00 AM-9:00 AM) bw(8)=3,
[9:00 AM-10:00 PM) bw(9)=7,
[10:00 AM-11:00 PM) bw(10)=6,
[11:00 AM-12:00 PM) bw(11)=1,
[12:00 PM-12:00 AM) bw(12)=bw(13)==bw(23)=0.

When mapping to bandwidth distribution by UTC, the time unit for local time must be changed from 1 hour to 3 hours:

from [1:00 AM-4:00 AM) bw(h8, 0)=ul(h8, 0)=12,
from [4:00 AM-7:00 AM) bw(h8, 1)=ul(h8, 1)=19,
from [7:00 AM-10:00 AM) bw(h8, 2)=ul(h8, 2)=17,
from [10:00 AM-1:00 PM) bw(h8, 3)=ul(h8, 3)=7,
from [1:00 PM-10:00 PM) bw(h8, 4)=bw(h8, 5)=bw(h8, 6)=ul(h8, 4)=ul(h8, 5)=ul(h8, 6)=0
from [10:00 PM-1:00 AM) bw(h8, 7)=ul(h8, 7)=1.

Note that λ=0 maps to local time interval starting at 1:00 AM, not midnight. In general, δ≤60 minutes, so λ=0 will map to local time interval starting from midnight.

Data center versus client machines: The storage-hops can be data centers or client programs (such as BitTorrent clients) on user computers. The number of storage-hops and the bandwidth at hops is dependent on whether the storage-hops are data centers or client machines. Data centers have large storage capacity and permit large transfers. Client machines, on the other hand, are unlikely to permit large transfers. It is prudent to only store small amounts of data on client machines, ensuring that transmissions are completed within a minute. When storage-hops are client machines, there may be hundreds of clients participating in each time zone. The file is divided into small segments—micro segments—and a client is responsible for the temporary storage and transmission of at most a single micro segment. We refer to client supported transfers as crowd GPSonflow. We have to construct models for crowd supported and data center supported GPSonflow.

Systems Model

The problem statement provides the available bandwidth at the sender and receiver networks. To construct the flow network, the bandwidth at storage-hops must be specified. Also, the number and type of storage-hops in each zone must be modeled.

Since the problem statement does not provide bandwidth specifications for storage-hops, the only assumption we make is that the bandwidth distribution conforms to the sleep-wake cycle. The bandwidth available to GPSonflow should not congest networks and IXs in the zone. We assume a common bandwidth distribution by local time for every zone. If a zone has several storage-hops, then the total bandwidth available to all the storage-hops cannot exceed this common bandwidth limit. Thus, a zone with several storage-hops does not get congested and bandwidth capacities in all zones are balanced. Note that if the problem statement provides available bandwidth distribution for storage-hops, then this input distribution is used.

The next question to be addressed is the modeling of the number of storage-hops in each zone. If storage-hops are data centers, then a single hop is sufficient in a zone; if storage-hops are client machines, then hundreds of storage-hops may be required in a zone. We model all the storage-hops in a zone by a single node; the number of nodes is modeled implicitly by transfer paths generated by the maximum flow algorithm. For example, if there are two transfer paths via zone 2, then it is assumed that the segments transferred along each path use different storage-hops in zone 2.

The type of storage-hop, client vs. data center, is modeled by the time unit δ. When GPSonflow uses data centers as storage-hops, the selection of δ is driven by the variance in bandwidth; when GPSonflow uses client machines as storage-hops, the selection of δ is driven by micro segment sizes that can be transmitted in minutes (or less). Therefore, for data center supported GPSonflow, δ value of 3 to 5 minutes is appropriate since it captures the variance in available bandwidth; for crowd supported GPSonflow, where micro segments are transferred, δ value of a few milliseconds or a minute is appropriate. In our model definition we assume δ≤60 minutes. Due to space constraints, the examples set δ to higher values such as 3 hours.

Definition 6—The networks participating in GPSonflow consist of the sender and receiver networks and a maximum of 24 storage-hop networks, with at most one storage-hop in each of the 24 UTC zones. (i.e., z(u)=z(v) for hops u, v.) All storage-hops have available bandwidth distribution that depends on the sleep-wake cycle. The 24 hour day is divided into Γ time periods of duration δ≤60 minutes; the UTC instant τ and the local time instant λ range from 0, 1, 2, . . . , Γ−1, where τ=0 corresponds to the time period starting from UTC hour 00:00 and λ=0 corresponds to the time period starting from midnight in the zone. The available bandwidth distribution by local time for the sender and receiver networks, ubw(s, λ) and dbw(r, λ), is provided. All storage-hops have a common bandwidth distribution by local time, ubw, dbw (unless the bandwidth distribution of storage-hops is provided as part of the problem specification). Equation 2 computes the uplink ul and downlink dl capacities, by UTC, of the sender, receiver, and hops.

Figure 5:
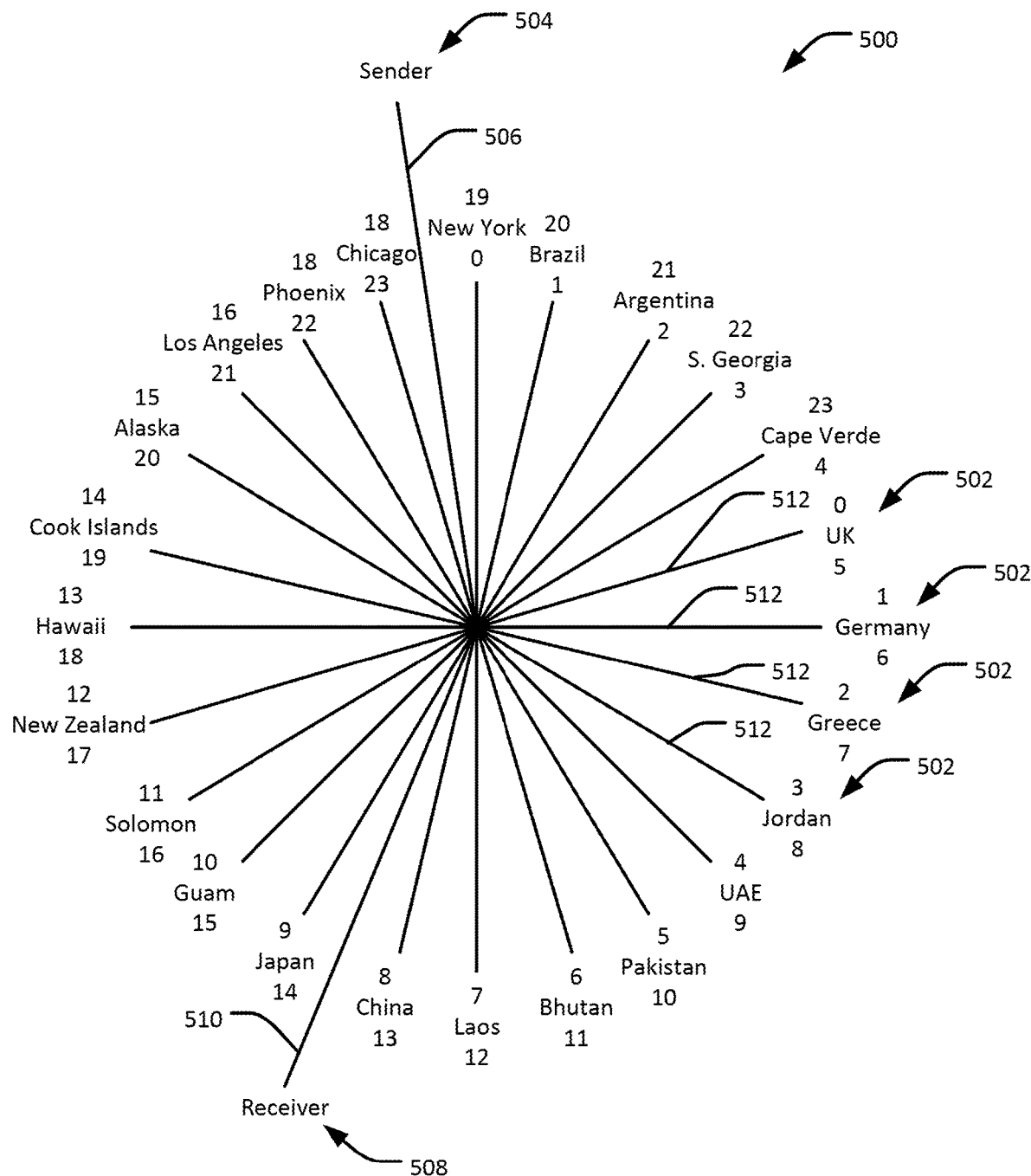
FIG. 5 shows an example systems model having 24 storage-hops, in accordance with an embodiment of the present disclosure.

FIG. 5 shows the systems model 118 when there are 24 storage-hops 502, one in each zone (for clarity, not all storage-hops 502 are labelled). The sender node 504 has uplink arc 506 and the receiver node 508 has downlink arc 510; all the other storage-hop nodes 502 have uplink and downlink edges (arcs 512; for clarity, not all arcs 512 are labelled). (In FIG. 5, the two edges of each arc 512 are not shown explicitly, but are implicitly represented by a single edge with no arrows.) The capacities along arcs 506, 510, 512 vary with time of day.

Graph Model

As shown in FIG. 5, the graph model is a star graph 500 with at most 26 leaf nodes (sender 504, receiver 508, and at most 24 storage-hop nodes 502). The arc 506, 510, 512 capacities vary with time of flow. The dynamic flow network has to be transformed to the static time expanded flow network for flow computation by maximum flow algorithms. Note that the time expanded flow network has no system parameters, only graph parameters; the system parameters are modeled implicitly.

All the leaf nodes 502, 504, 508 (see FIG. 5) have storage capacity, allowing them to store data for transfer at a later time instant. The holdover arc (ut, ut+1), u ∈ V, models u at t storing data for transmission at t+1. The hub node has no storage capacity. This ensures that the star graph models end-to-end flow; a flow initiated from leaf node u at time t will arrive at a leaf node v at time t (or it could stay in node u until next flow instant t+1). When flow is initiated from leaf nodes u to leaf node v, the flow cannot exceed the minimum of the capacities along the arcs (u, x) and (x, v).

Size of GPSonflow Model

The significant parameters that drive the performance of large file transfers is the available bandwidth distribution by time of the participating networks—the sender, the receiver, and the storage-hops—and the duration of flow. Therefore, the intuitive size of the model is $O(nT)$ where n is the number of networks and T is the flow duration. Our model bounds the value of n to 26, a maximum of 24 hops plus the sender and receiver, regardless of the number of storage-hops participating in the transfer. Thus, our GPSonflow model has $O(T)$ nodes and arcs.

Automating Model Construction with GPSclock

There is one issue with the GPSonflow time expanded network—its scale, which makes manual construction error prone and tedious. The GPSonflow network must model the bandwidth of the participating networks at each time instant during flow duration, which may last for several days. For a given duration and 26 nodes, the number of time instants depends on the time unit $\delta$. With $\delta$ of 5 minutes and duration of 24 hours, there are 288 subgraphs in the time expanded flow network for a total of 14400 arcs (without accounting for holdover arcs). With a time unit of 1 minute and a duration of 24 hours, there are 72000 arcs in the time expanded graph. Moreover, changing the value of any input parameter—start time, available bandwidth distribution, duration, positioning of storage nodes—requires the construction of a new flow model. Finding the optimal solution requires several executions of the maximum flow algorithm with various combinations of the input parameters.

We develop a data structure, GPSclock, that constructs the $O(T)$ time expanded GPSonflow graph. The complexity of GPSclock is $O(1)$. The basis of GPSclock is the mapping of the model from the systems domain to the graph domain. The mapping between systems domain and graph domain is done via UTC time instants: every flow instant, t, maps to exactly one UTC instant, $\tau$. The range of t depends on flow duration T, which is unbounded. The range of $\tau$ depends on $\Gamma$, which is bounded by the number of time units in a day; therefore, the bandwidth distribution by UTC has a fixed, bounded set of values. Equation 3 shows the mapping of bandwidth distribution by t to bandwidth distribution by UTC. The two distributions are mapped using the anchoring relationship:

t=0 when $\tau=\theta$, $\theta$=UTC instant when flow starts.

Thus, the arc capacities in the $O(T)$ time expanded network are generated from the $O(1)$ network bandwidth capacities by UTC.

We have quantified the relationship between flow instant and UTC, but bandwidth availability is a function of the sleep-wake cycle, which is a function of local time $\lambda$. For a given flow instant t, the value of $\tau$ is constant across the globe, but the value of $\lambda$ varies in each zone. The range of $\lambda$ is equal to the range of $\tau$, which is equal to the number of time units in a day. There is a 1-1, onto mapping between each network's $\lambda$ and $\tau$ (every $\lambda$ maps to a unique $\tau$ and vice versa). The two distributions are mapped using the anchoring relationship, defined by Equation 1: for a given network v in zone z(v) and UTC instant $\tau$, if v is in zone 0, $\lambda=\tau$;

if v is not in zone 0, $\lambda=(z(v)\times(60/\delta)+\tau)$ mod $\Gamma$.

Constructing the flow model: The GPSonflow problem statement provides the zone numbers, z(s), z(r), and available bandwidth distribution by local time for the sender and receiver. The time unit for the input bandwidth distribution is $\Delta$.

The value of $\delta$, the time unit for the model, is set by the modeler depending on whether GPSonflow is crowd supported or data center supported. Once $\delta$ is determined, the values of ubw(s, $\lambda$) and dbw(r, $\lambda$), $\lambda$=0, 1, . . . , $\Gamma$−1 are computed by mapping bandwidth in A time units to bandwidth in $\delta$ time units (as explained in Example 6).

Next, we model the storage-hops: the problem statement may provide the geographic positioning and bandwidth distributions of the storage-hops. If so, z( ), ubw( ), and dbw( ) are generated from the provided data. When the modeler has to generate storage-hop data, a common bandwidth distribution by local time is used for all storage-hops. The hops may be placed in some or all of the 24 zones. Other input parameters required for model construction are the flow duration T and the UTC start time $\theta$. The flow network is constructed using GPSclock, which is defined below.

Definition 7—The GPSclock, $C(\delta, \theta, T)$, tracks the local time instant $\lambda$=0, 1, . . . , $\Gamma$−1, in every UTC zone $\mu$=0, 1, . . . , 23, at each flow instant t=0, 1, . . . , T−1.

Let lt($\mu$, t) represent the local time instant in zone $\mu$ at flow instant t. The initial configuration of C at t=0 when UTC instant $\tau=\theta$ is given by:

$$lt(\mu,0)=(\mu\times(60/\delta)+\theta \bmod \Gamma, \forall \mu \in [0,24)$$

At each clock tick, t=t+1 and:

$$lt(\mu,t)=(lt(\mu,t-1)+1) \bmod \Gamma, \forall \mu \in [0,24)$$

The global clock is a tool that gives the local time of every zone at each flow instant t. With GPSclock, the local time in a zone, $\mu$, at any flow instant, t, is given by:

$$lt(\mu,t)=(lt(\mu,0)+t) \bmod \Gamma$$

The advantage of GPSclock is that the bandwidth capacity at any node, v, at any flow instant, t, is given by:

$$c(v_t,x_t)=bw(v,lt(z(v),t))$$

We use this relationship to construct the time expanded flow network from the input bandwidth distributions by local time.

Algorithm 1—Constructing the time expanded flow network

Input: GPSclock $C(\delta, \theta, T)$,
Input: $\forall$ u ∈ V, z(u);
Input: $\forall$ u ∈ V, ubw(u, $\lambda$), dbw(u, $\lambda$), $\lambda$=0, 1, . . . , $\Gamma$−1;

```
for t = 0 to T-1 do
    for ∀ u ∈ V do
        c(u_t, x_t) = ubw(u, lt(z(u), t));
        c(x_t, u_t) = dbw(u, lt(z(u), t));
        if t < T-1 then
            c(u_t, u_{t+1}) = ∞;
```

When an input parameter, say start time θ, is changed, the flow network can be constructed by changing the initial configuration of GPSclock. Thus, GPSclock automates model construction.

The time expanded flow network for GPSonflow contains the state of all the participating networks at every flow instant t=0, 1, . . . , T−1. Let n represent the number of participating networks, which includes the sender, receiver, and all storage-hops. The complexity of our model construction algorithm is O(T). We have developed a model with O(T) nodes/edges by identifying that the defining characteristic of a hop is its time zone positioning. It is not the individual network that matters—t is the time zone location. All the networks in a zone can be modeled as one network. The unit of time can be used to model the number of nodes. Since there are a constant number of time zones (i.e., 24), the maximum number of nodes in our model is bounded. Thus, we have used the sleep-wake cycle to reduce the size of the model.

The graph model captures bandwidth distribution as arc capacities, which vary with graph time (flow instants). The size of the time expanded flow network is dependent on the duration of flow T—an unbounded variable. Our algorithm constructs the unbounded network from a constant number of input variables—the available bandwidth capacity by time of day of the sender, receiver, and one or more time zones. We achieve this by again incorporating the diurnal periodicity of bandwidth in our systems model 118.

We develop GPSclock, a data structure that maps graph time (flow instants) to time of day in all networks. The defining feature of GPSclock is that it maps the unbounded graph instant t to system time (τ and λ), which is periodic with period Γ, the length of a day. We then use GPSclock to automatically compute graph arc capacities at each flow instant from bandwidth capacities at each time of day instant. GPSclock can be used for construction of graphs for other applications where arc capacity is a function of time of day.

Graph Model for Indirect Transfer

Definition 8—dynamic flow network: For a flow duration t=0 until t=T−1 (UTC instants τ=θ until τ=θ+T−1, 0≤τ, θ<Γ), G*=(V∪x, E, T) where V is the set of 26 nodes representing the sender s, the receiver r, and the storage-hops in 24 time zones;

x represents a single hub node; and

E is the set of arcs $\{(s, x), (x, r)\} \cup \{(v, x), (x, v) | \forall v \in V-s-r\}$.

G* is a star network where the leaves are in node set V and the hub is node x. The nodes in V have infinite storage capacity, and the node x has zero storage capacity. The arcs in E have bandwidth capacity:

$$c(v,x,t) = ul(v,\tau) \forall (v,x) \in E$$

$$c(x,v,t) = dl(v,\tau) \forall (x,v) \in E \quad \text{(Equation 3)}$$

∀t=0, 1, T−1 where τ=θ+t in modulo Γ arithmetic.

Definition 9—static flow network: The dynamic flow network G*=(V∪x, E, T) transforms to the time expanded flow network G=(V_T∪X_T, E_T∪H_T) where $V_T$ is the set of end nodes $u_t$, $\forall u \in V$ and t=0, 1, . . . , T−1;

$X_T$ is the set of hub nodes $x_t$, t=0, 1, . . . , T−1;

$E_T$ is the set of arcs $(u_t, x_t), (x_t, u_t), \forall (u, x), (x, u) \in E$ and t=0, 1, . . . , T−1;

$H_T$ is the set of holdover arcs $(u_t, u_{t+1})$, $\forall u \in V$ and t=0, 1, . . . , T−2.

The arcs have capacity:

$$c(u_t, x_t) = c(u,x,t), c(x_t, u_t) = c(x,u,t), \text{ and } c(u_t, u_{t+1}) = \infty$$

Definition 10—A flow in time expanded G is a function $f: (V_T \cup X_T) \times (V_T \cup X_T) \to N_0$ satisfying the properties of skew symmetry, flow conservation and capacity constraint: ∀ nodes $u_t \in V_T$, $x_t \in X_T$, t∈[0,T), $f(u_t, x_t) \leq c(u_t, x_t)$ and $f(u_t, u_{t+1}) \leq c(u_t, u_{t+1})$.

The value $|f|$ of a flow $f$ in G is $|f|=f(s_0, x_0)+f(s_0,s_1)=f(x_{T-1},r_{T-1})+f(r_{T-2},r_{T-1})$.

Example Methodology

Figure 6:
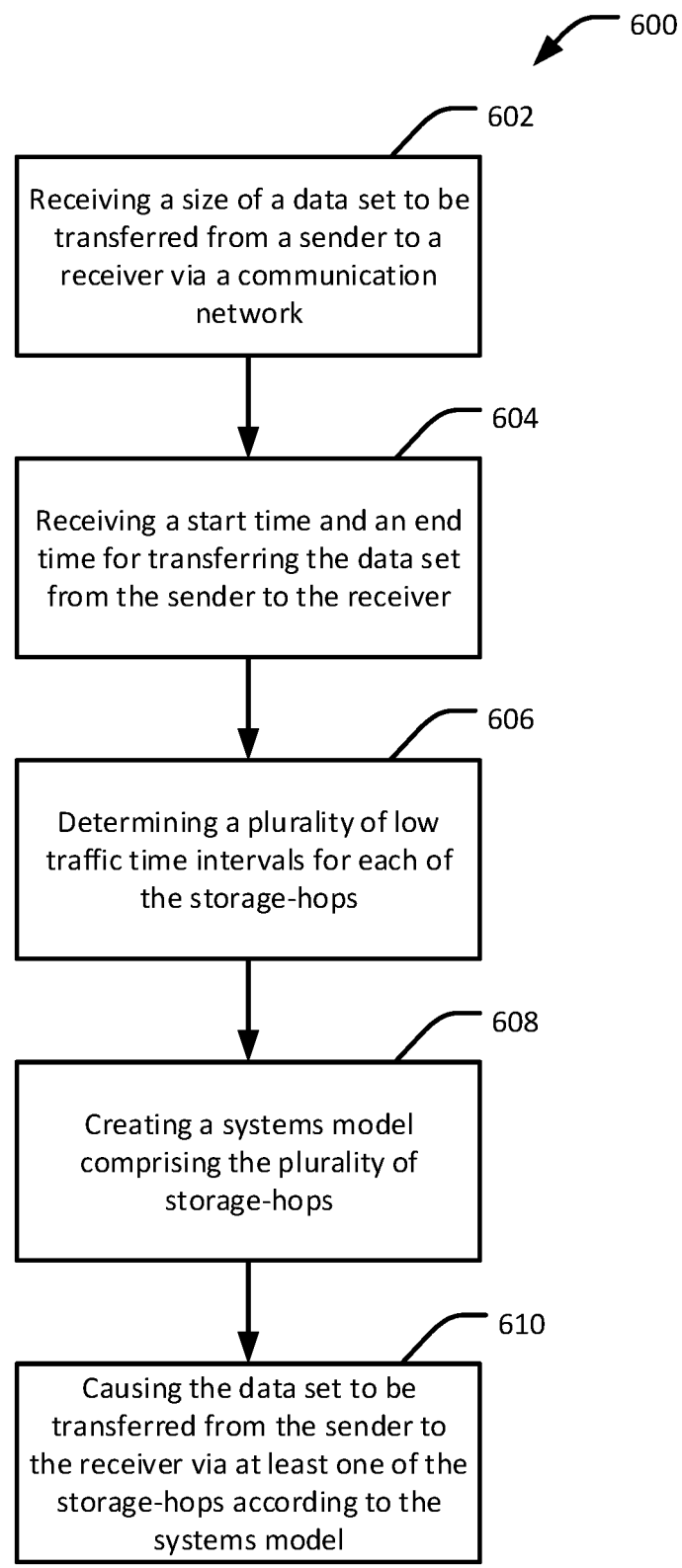
FIG. 6 is a flow diagram for a data transfer method, in accordance with an embodiment of the present disclosure.

FIG. 6 is a flow diagram for a method 600 of transferring data via a communication network based on geographical locations of a plurality of storage-hops in the communication network, in accordance with an embodiment of the present disclosure. All or portions of the method 600 can be implemented, for example, in the data routing module 114 of FIG. 1. The method 600 includes receiving 602 a size of a data set to be transferred from a sender to a receiver via the communication network; receiving 604 a start time and an end time for transferring the data set from the sender to the receiver; determining 606 a plurality of low traffic time intervals for each of the storage-hops; creating 608 a systems model comprising the plurality of storage-hops, wherein each storage-hop is associated with a local time based on the respective geographical location, a global time, an uplink capacity, a downlink capacity, at least one respective low traffic time interval, and bandwidth; and causing 610 the data set to be transferred from the sender to the receiver via at least one of the storage-hops according to the systems model.

In some cases, the systems model is a first systems model, and the method include creating a graph model comprising the first systems model and at least one additional systems model, wherein each systems model is associated with a time interval between the start time and the end time. In some cases, the method includes creating a graph model from the systems model, the start time, and the end time. In some cases, causing the data set to be transferred includes computing the largest possible size of a data set that can be transferred from the sender to the receiver within a time duration using a subset of the plurality of storage-hops, wherein each transfer occurs during the respective low traffic time interval of the respective storage-hop; and creating an ordered list of the storage-hops that are capable of transferring the computed largest possible size of a data set between the sender and the receiver. In some such cases, the method includes transferring the data set from the sender to a first storage-hop in the ordered list during a respective low traffic time interval of the first storage-hop before the end time; transferring the data set to a next storage-hop in the ordered list during a respective low traffic time interval of the next storage-hop before the end time; and transferring the data set from a last storage-hop in the ordered list to the receiver during a respective low traffic time interval of the last storage-hop before the end time. In some cases, causing the data set to be transferred includes splitting the data set into a plurality of subsets; and transferring the plurality of subsets from the sender to the receiver. In some cases, causing the data set to be transferred includes sending the data set from the sender to one of the storage-hops; storing the data set in a storage associated with the storage-hop; and removing the data set from a storage associated with the sender. In some cases, at least two of the storage-hops have different storage capacities. In some cases, at least two of the storage-hops have different bandwidths, and wherein each bandwidth varies between the start time and the end time. In some cases, each low traffic time interval is associated with a sleep zone of the respective storage-hop (i.e., when the local time of the storage-hop is during sleep hours). In some cases, the plurality of storage-hops includes at least one storage-hop in each of a plurality of time zones.

Computing Device

Figure 7:
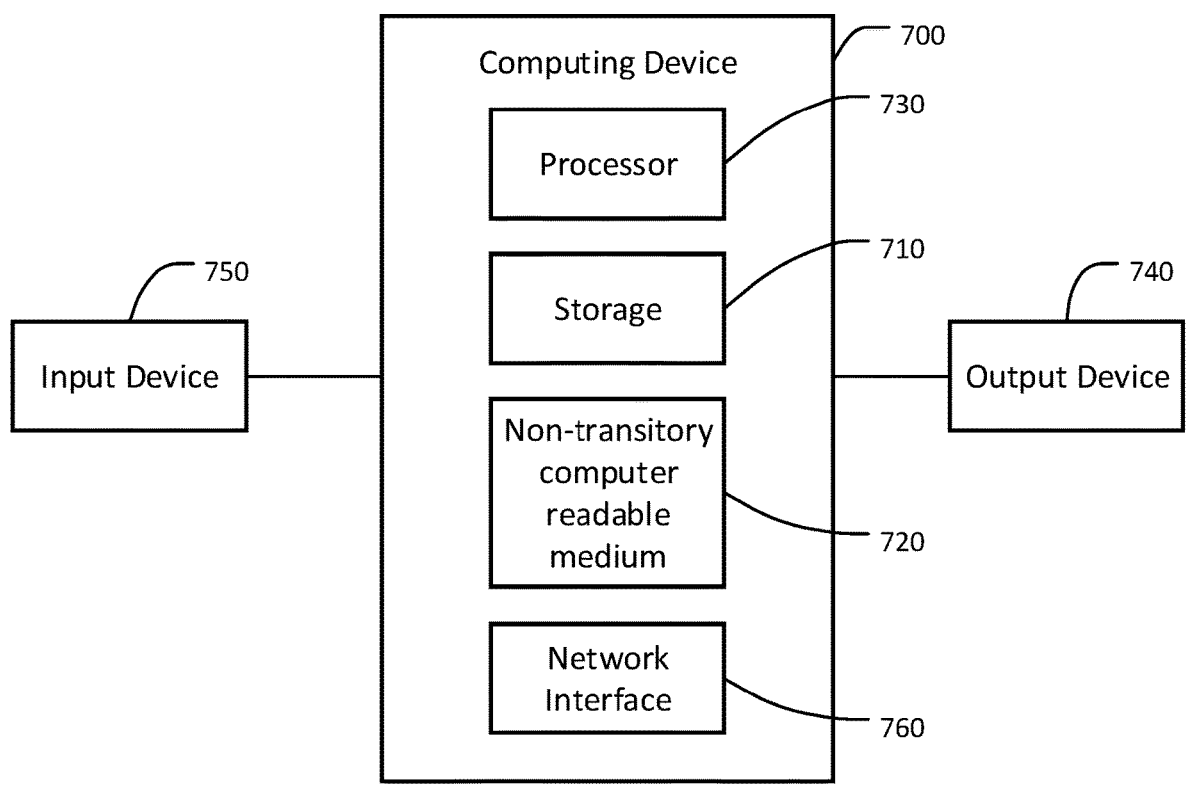
FIG. 7 is a block diagram representing an example computing device that may be used to perform any of the techniques as variously described in this disclosure.

FIG. 7 is a block diagram representing an example computing device 700 that may be used to perform any of the techniques as variously described in this disclosure. For example, the system 100 of FIG. 1, or any portions thereof, and the methodologies of FIG. 6, or any portions thereof, may be implemented in the computing device 700. The computing device 700 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The computing device 700 includes one or more storage devices 710 or non-transitory computer-readable media 720 having encoded thereon one or more computer-executable instructions or software for implementing techniques as variously described in this disclosure. The storage devices 710 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 710 may include other types of memory as well, or combinations thereof. The storage device 710 may be provided on the computing device 700 or provided separately or remotely from the computing device 700. The non-transitory computer-readable media 720 may include, but are not limited to, one or more types of hardware memory, non-transitory tangible media (for example, one or more magnetic storage disks, one or more optical disks, one or more USB flash drives), and the like. The non-transitory computer-readable media 720 included in the computing device 700 may store computer-readable and computer-executable instructions or software for implementing various embodiments. The computer-readable media 720 may be provided on the computing device 700 or provided separately or remotely from the computing device 700.

The computing device 700 also includes at least one processor 730 for executing computer-readable and computer-executable instructions or software stored in the storage device 710 or non-transitory computer-readable media 720 and other programs for controlling system hardware. Virtualization may be employed in the computing device 700 so that infrastructure and resources in the computing device 700 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 700 through an output device 740, such as a screen or monitor, which may display one or more user interfaces provided in accordance with some embodiments. The output device 740 may also display other aspects, elements or information or data associated with some embodiments. The computing device 700 may include other input devices 750 for receiving input from a user, for example, a keyboard, a joystick, a game controller, a pointing device (e.g., a mouse, a user's finger interfacing directly with a touch-sensitive display device, etc.), or any suitable user interface, including a VR headset. The computing device 700 may include other suitable conventional I/O peripherals. The computing device 700 includes or is operatively coupled to various suitable devices for performing one or more of the aspects as variously described in this disclosure.

The computing device 700 may run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 700 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as data routing module 114, is implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 700, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A method for transferring data via a communication network based on geographical locations of each of a sender, a receiver, and one or more storage-hops in the communication network, the method comprising:
receiving a data set to be transferred from the sender to the receiver via the communication network;
determining a plurality of time intervals for each of the one or more storage-hops;
generating a systems model representing an uplink and downlink bandwidth capacity for each of the sender, the receiver, and the one or more storage-hops, wherein each of the sender, the receiver, and the one or more storage-hops are associated with a local time zone based on the respective geographical location, the respective uplink bandwidth capacity, and the respective downlink bandwidth capacity
generating a graph model representing a bandwidth distribution in the systems model at a plurality of time instants during each of the time intervals, the graph model based on the systems model, a start time for transferring the data set from the sender to the receiver, and an end time for transferring the data set from the sender to the receiver, wherein the graph model is represented as a star graph that includes a plurality of leaf nodes representing the sender, the receiver, or one or more of the storage-hops at each of the time instants, and wherein the graph model further includes a plurality of arcs between the leaf nodes, each of the arcs representing a bandwidth flow capacity between the respective leaf nodes and the Internet based on the geographic location and the uplink and downlink bandwidth capacity of each of the sender, the receiver, and the one or more storage-hops at a respective one of the time instants; and
causing the data set to be transferred from the sender to the receiver via at least one of the storage-hops based on the bandwidth distribution of each of the sender, the receiver, and the one or more storage-hops according to the graph model.

2. The method of claim 1, wherein the time interval is a time interval between the start time and the end time.

3. The method of claim 1, wherein causing the data set to be transferred further comprises:
computing a largest possible size of a data set that can be transferred from the sender to the receiver within a time duration using a subset of the plurality of storage-hops, wherein each transfer occurs during the respective time interval of the respective storage-hop; and
creating an ordered list of the storage-hops that are capable of transferring the computed largest possible size of the data set between the sender and the receiver.

4. The method of claim 3, further comprising:
transferring the data set from the sender to a first storage-hop in the ordered list during a respective time interval of the first storage-hop before an end time for transferring the data set from the sender to the receiver;
transferring the data set to a next storage-hop in the ordered list during a respective time interval of the next storage-hop before the end time; and
transferring the data set from a last storage-hop in the ordered list to the receiver during a respective time interval of the last storage-hop before the end time.

5. The method of claim 1, wherein causing the data set to be transferred further comprises:
splitting the data set into a plurality of subsets; and
transferring the plurality of subsets from the sender to the receiver.

6. The method of claim 1, wherein causing the data set to be transferred further comprises:
sending the data set from the sender to one of the storage-hops;
storing the data set in a storage associated with the storage-hop; and
removing the data set from a storage associated with the sender.

7. The method of claim 1, wherein at least two of the storage-hops have different storage capacities.

8. The method of claim 2, wherein at least two of the storage-hops have different uplink and downlink bandwidth capacities, and wherein each uplink and downlink bandwidth capacity varies between the start time and the end time.

9. The method of claim 1, wherein each time interval is associated with a sleep zone of the respective storage-hop.

10. The method of claim 1, wherein the plurality of storage-hops includes at least one storage-hop in each of a plurality of different time zones.

* * * * *